(12) United States Patent
Saar

(10) Patent No.: US 9,075,764 B2
(45) Date of Patent: Jul. 7, 2015

(54) MULTIPROCESSOR SYSTEM-ON-A-CHIP FOR MACHINE VISION ALGORITHMS

(75) Inventor: Idan Saar, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 996 days.

(21) Appl. No.: 13/074,034

(22) Filed: Mar. 29, 2011

(65) Prior Publication Data

US 2012/0042150 A1    Feb. 16, 2012

Related U.S. Application Data

(60) Provisional application No. 61/372,563, filed on Aug. 11, 2010.

(51) Int. Cl.
  *G06F 15/76*  (2006.01)
  *G06F 9/06*   (2006.01)
  *G06F 15/167* (2006.01)

(52) U.S. Cl.
  CPC ................................ *G06F 15/167* (2013.01)

(58) Field of Classification Search
  CPC ... G06F 15/16; G06F 12/084; G06F 17/3007; G06F 15/7839; G06F 15/76; G06F 9/06; G06F 3/14; G06F 21/606; G06F 15/167; G06F 9/3848
  USPC ............ 711/137, 130, 154, 168; 712/E9.003, 712/30, 218, 228, E9.051; 709/231, 237; 710/53, 52, 56
  See application file for complete search history.

(56) References Cited

U.S. PATENT DOCUMENTS

| | | | |
|---|---|---|---|
| 5,721,830 A * | 2/1998 | Yeh et al. | 709/237 |
| 5,761,706 A * | 6/1998 | Kessler et al. | 711/118 |
| 6,243,836 B1 * | 6/2001 | Whalen | 714/45 |
| 6,574,725 B1 * | 6/2003 | Kranich et al. | 712/31 |
| 6,606,688 B1 * | 8/2003 | Koyanagi et al. | 711/137 |
| 6,977,897 B1 * | 12/2005 | Nelson et al. | 370/235 |
| 7,237,071 B2 | 6/2007 | Jahnke | |

(Continued)

FOREIGN PATENT DOCUMENTS

JP    2002041358 A    2/2002

OTHER PUBLICATIONS

JP Application # 2011-127961 Office Action dated Mar. 11, 2015.

*Primary Examiner* — Tuan Thai
*Assistant Examiner* — Edward Waddy, Jr.
(74) *Attorney, Agent, or Firm* — D. Kligler I.P. Services Ltd.

(57) ABSTRACT

A multiprocessor system includes a main memory and multiple processing cores that are configured to execute software that uses data stored in the main memory. In some embodiments, the multiprocessor system includes a data streaming unit, which is connected between the processing cores and the main memory and is configured to pre-fetch the data from the main memory for use by the multiple processing cores. In some embodiments, the multiprocessor system includes a scratch-pad processing unit, which is connected to the processing cores and is configured to execute, on behalf of the multiple processing cores, a selected part of the software that causes two or more of the processing cores to access concurrently a given item of data.

16 Claims, 7 Drawing Sheets

(56) References Cited

U.S. PATENT DOCUMENTS

| | | |
|---|---|---|
| 7,529,799 B2 | 5/2009 | Alvarez, II et al. |
| 8,683,132 B1* | 3/2014 | Danilak .................... 711/137 |
| 8,731,044 B2* | 5/2014 | Watanabe .................. 375/240 |
| 2005/0144416 A1* | 6/2005 | Lin ............................. 711/201 |
| 2007/0101105 A1* | 5/2007 | Diefendorff ................ 712/225 |
| 2010/0070730 A1* | 3/2010 | Pop et al. ................... 711/167 |
| 2010/0268892 A1* | 10/2010 | Luttrell ...................... 711/137 |
| 2011/0238922 A1* | 9/2011 | Hooker et al. ............. 711/137 |

* cited by examiner

MULTIPROCESSOR SYSTEM-ON-A-CHIP FOR MACHINE VISION ALGORITHMS

CROSS-REFERENCE TO RELATED APPLICATIONS

This application claims the benefit of U.S. Provisional Patent Application 61/372,563, filed Aug. 11, 2010, whose disclosure is incorporated herein by reference.

FIELD OF THE INVENTION

The present invention relates generally to multiprocessor systems, and particularly to methods and systems for efficient usage of shared resources in a multiprocessor system.

BACKGROUND OF THE INVENTION

The implementation of complete multiprocessor systems, and, in particular, Symmetrical Multiprocessing (SMP) system in a single monolithic device has grown in popularity in recent years, fueled by the increasing density of VLSI devices and emergence of computation tasks with increasing complexity, such as those required for real-time machine-vision. In some multiprocessor systems, memory resources are shared by a plurality of processors. Such sharing, however, may create memory coherency issues and performance bottlenecks.

In U.S. Pat. No. 7,529,799, whose disclosure is incorporated herein by reference, the inventors present a distributed system structure of a large SMP system, using a bus-based cache-coherence protocol. The distributed system structure contains an address switch, multiple memory subsystems, and multiple master devices, either processors, I/O agents, or coherent memory adapters, organized into a set of nodes supported by a node controller. The node controller receives transactions from a master device, communicates with a master device as another master device or as a slave device, and queues transactions received from a master device. Since the achievement of coherency is distributed in time and space, the node controller helps to maintain cache coherency. In addition, a transaction tag format for a standard bus protocol is expanded to ensure unique transaction tags are maintained throughout the system. A sideband signal is used for intervention and Reruns to preserve transaction tags at the node controller in certain circumstances.

In U.S. Pat. No. 7,237,071, whose disclosure is incorporated herein by reference, an SMP system having parallel multiprocessing architecture composed of identical processors and including a single program memory is presented. Program access arbitration logic supplies an instruction to a single requesting central processing unit at a time. Shared memory access arbitration logic can supply data from separate simultaneously accessible memory banks or arbitrate among central processing units for access. The system may simulate an atomic read/modify/write instruction by prohibiting access to the one address by another central processing unit for a predetermined number of memory cycles following a read access to one of a predetermined set of addresses in said shared memory.

SUMMARY OF THE INVENTION

An embodiment of the present invention provides a multiprocessor system that includes a main memory, multiple processing cores and a data streaming unit. The multiple processing cores are configured to execute software that uses data stored in the main memory. The data streaming unit is connected between the processing cores and the main memory and is configured to pre-fetch the data from the main memory for use by the multiple processing cores.

In some embodiments, the data streaming unit is configured to store the data in the main memory on behalf of the multiple processing cores. In an embodiment, the data streaming unit includes arbitration circuitry that is configured to resolve simultaneous accesses to the main memory that are performed on behalf of two or more of the processing cores.

In some embodiments, the data streaming unit includes, for each processing core, a respective front-end unit that is configured to receive from the processing core a respective list of addresses in the main memory, and to pre-fetch the data from the main memory in accordance with the list. In a disclosed embodiment, the multiprocessor system includes a respective local memory associated with each processing core, and each processing core and the corresponding front-end unit are configured to exchange the data via the respective local memory.

In an embodiment, each processing core and the corresponding front-end unit are configured to maintain the list of addresses in a circular buffer that is stored in the respective local memory. In some embodiments, at least the processing cores and the data streaming unit are comprised in a single integrated circuit.

There is also provided, in accordance with an embodiment of the present invention, a multiprocessor system including a main memory, multiple processing cores and a scratch-pad processing unit. The multiple processing cores are configured to execute software that uses data stored in the main memory. The scratch-pad processing unit is connected to the processing cores and is configured to execute, on behalf of the multiple processing cores, a selected part of the software that causes two or more of the processing cores to access concurrently a given item of data.

In some embodiments, the scratch-pad processing unit includes a dedicated memory for storing the given item of data that is accessed by the two or more of the processing cores. In an embodiment, the scratch-pad processing unit is configured to accept scratch-pad instructions from the processing cores, to arbitrate the scratch-pad instructions and to execute the arbitrated scratch-pad instructions in the dedicated memory. In a disclosed embodiment, at least the processing cores and the scratch-pad processing unit are included in a single integrated circuit.

There is additionally provided, in accordance with an embodiment of the present invention, a method for data processing. The method includes executing software, which uses data stored in a main memory, on multiple processing cores of a multiprocessor system. The data is pre-fetched from the main memory by a data streaming unit that is connected between the processing cores and the main memory, for use by the multiple processing cores.

There is further provided, in accordance with an embodiment of the present invention, a method for data processing. The method includes executing software, which uses data stored in a main memory, on multiple processing cores of a multiprocessor system. A selected part of the software, which causes two or more of the processing cores to access concurrently a given item of data, is executed on behalf of the processing cores using a scratch-pad processing unit that is connected to the multiple processing cores.

The present invention will be more fully understood from the following detailed description of the embodiments thereof, taken together with the drawings in which:

DETAILED DESCRIPTION OF EMBODIMENTS

Overview

Some multiprocessor systems are implemented in a single integrated circuit (System on a Chip, or SOC). The SOC typically comprises one or more instances of local memory units, but not the main memory, which may be substantially larger than the local memory. The main memory is typically implemented in one or more integrated circuits, which allow high bandwidth for sequential (burst) accesses but have long latency. When such a main memory is shared among a plurality of processors in a multiprocessor system, efficient arbitration should be exercised in order to avoid severe performance degradation as a result of queuing of accesses to the memory.

Embodiments of the present invention introduce a novel method to mitigate performance bottlenecks in multiprocessor systems that are caused by a plurality of processors accessing shared memory resources. According to embodiments of the present invention, the multiprocessor system comprises a Data Streaming Unit (DSU) that fetches data from main memory before it is needed by the processor cores. The DSU stores the fetched data in local memories coupled to the processor cores, where the data can be accessed by the processor cores as needed. The DSU also writes data from the local memories to the main memory.

Another issue associated with multiprocessor systems is ensuring memory coherency when two or more processors access the same memory locations. In some image-processing oriented algorithms that execute in a multiprocessor system, access to the same address in main memory by several processor cores is rare, and takes place, for example, in tasks that gather image statistics from areas of the image that are processed by several processor cores. Yet, such rare occasions may still create performance bottlenecks if not handled efficiently. Embodiments of the present invention introduce a novel way to mitigate such bottlenecks. According to the disclosed embodiments, all accesses to shared memory locations are handled by a Scratch-Pad Unit, which comprises dedicated processors and small local memories, and executes software that is optimized for the execution of parallel tasks that access shared memory locations. The Scratch-Pad Unit is typically attached to the processor cores of the multiprocessor system as a co-processor.

System Description

Figure 1:
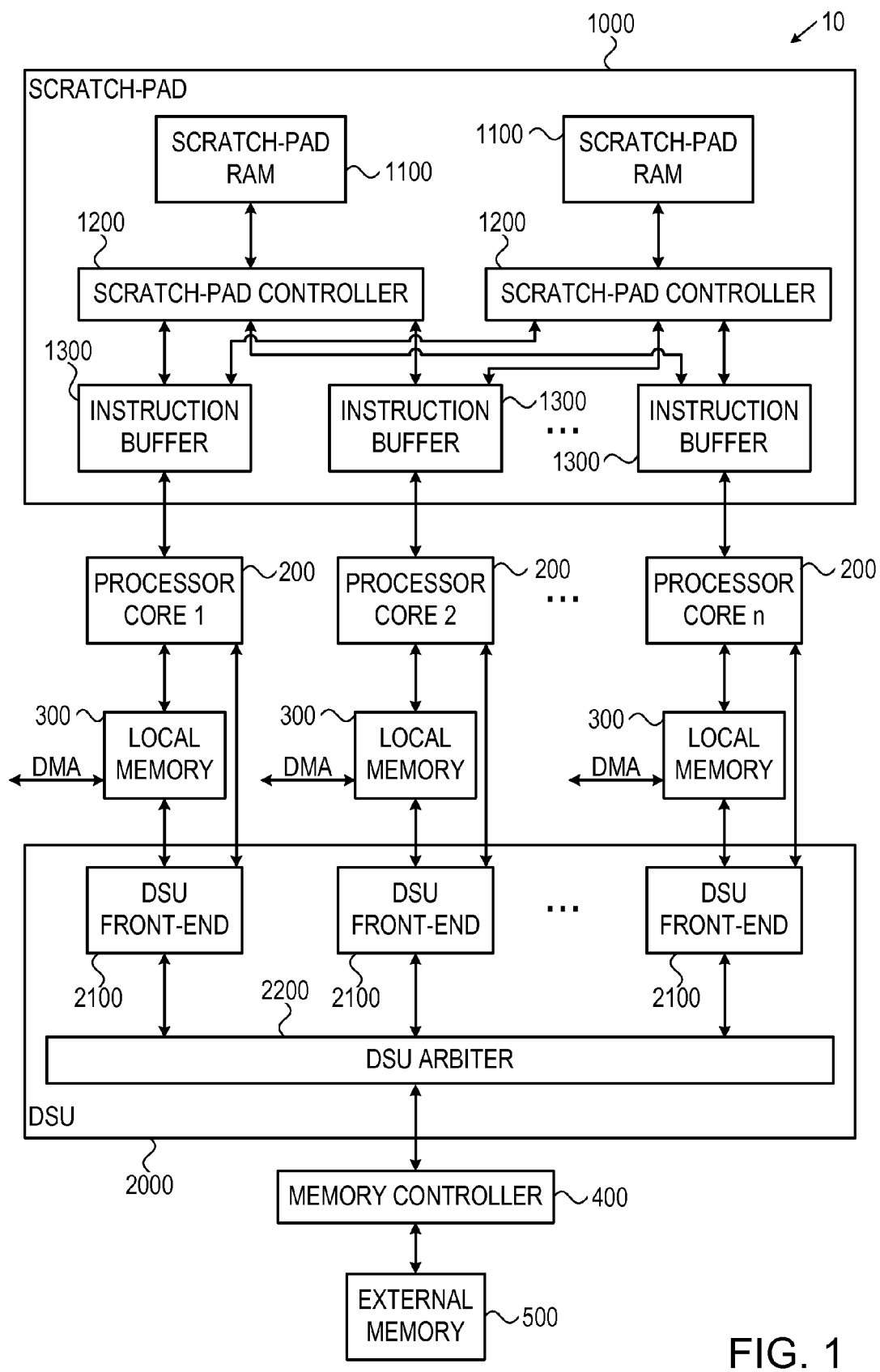
FIG. 1 is a block diagram that schematically illustrates a multiprocessor system, in accordance with an embodiment of the present invention.

FIG. 1 is a block diagram which schematically illustrates a multiprocessor system 10, in accordance with an embodiment of the present invention. All the illustrated elements of multiprocessor system 10 may be located in a single integrated circuit, and constitute a System on a Chip (SOC).

Multiprocessor system 10 includes a main memory 500 (also referred to as external memory). In some embodiments, main memory 500 comprises one or more separate integrated circuits, and is not part of the multiprocessor SOC. In other embodiments, the main memory and the other elements of multiprocessor system 10 are located in the same SOC. In yet other embodiments, main memory 500 may comprise several parts, some of which are located in the SOC, and some in one or more external chips. In the following description, the term "external memory" will be used for main memory; however, the present invention is by no way limited to main memory which is not implemented in the SOC.

A Memory Controller 400, located in the SOC, controls accesses to the external memory, and, in some embodiments, may provide storage refresh mechanism and other memory control functions. In some embodiments, local memory units 300 are attached to respective processor cores 200. Each local memory unit may access external memory 500 through memory controller 400 using a Direct Memory Access (DMA) channel, for example, to fill a code segment.

According to embodiments of the present invention, performance degradation as a result of accesses to shared memory locations in the main memory is reduced by a Data Streaming Unit (DSU) 2000. DSU 2000 may be configured to pre-fill Local memory units 300 (one for each processor core) with data from external memory 500, typically prior to the time processor cores 200 need to access that data, minimizing delays of processors 200 as a result of read contentions on accesses to the external memory. In a similar manner, DSU 2000 sends to external memory 500 data that is written by processor cores 200 to local memories 300, thus minimizing delays of processors 200 as a result of write contentions on accesses to the external memory.

DSU 2000 comprises a DSU Arbiter 2200, which governs accesses to memory controller 400, and DSU Front-End units 2100, where each front end unit connects to a respective local memory 300 and to a single respective processor core 200.

In some embodiments, access to shared memory locations are handled by a Scratch-pad unit 1000, which may comprise Instruction Buffers 1300, each connected to a respective processor core 200. Scratch pad unit 1000 comprises one or more scratch-pad Random Access Memories (RAMs) 1100, and one or more Scratch-Pad Controllers 1200, where each scratch-pad RAM is connected to instruction buffers 1300 through a respective scratch-pad controller 1200.

In a typical implementation, buffers 1300 temporarily store instructions that are generated by processor cores 200, until the current instruction wins the arbitration for a requested scratchpad controller (according to a target address accompanied with the instruction). In the embodiment of FIG. 1 (although not necessarily) each processor core 200 is connected to a respective dedicated instruction buffer 1300. Once an instruction is buffered in the instruction buffer, the buffer requests access to the appropriate scratchpad controller 1200 according to the target address accompanied with the buffered instruction. When access is granted, the instruction is sent from the instruction buffer to the scratchpad controller for execution.

Scratch-Pad unit 1000 allows independent execution of common shared memory multiprocessor tasks by scratch pad controllers 1200, which are coupled to execute common shared memory tasks in an optimized manner, off-loading processor cores 200 and guaranteeing memory coherency by introducing an efficient memory-lock mechanism. This technique is efficient since the memory is not physically locked. The disclosed technique ensures that the full read-modify-write cycle is performed atomically by the controller.

Data Streaming Unit (DSU)

Figure 2:
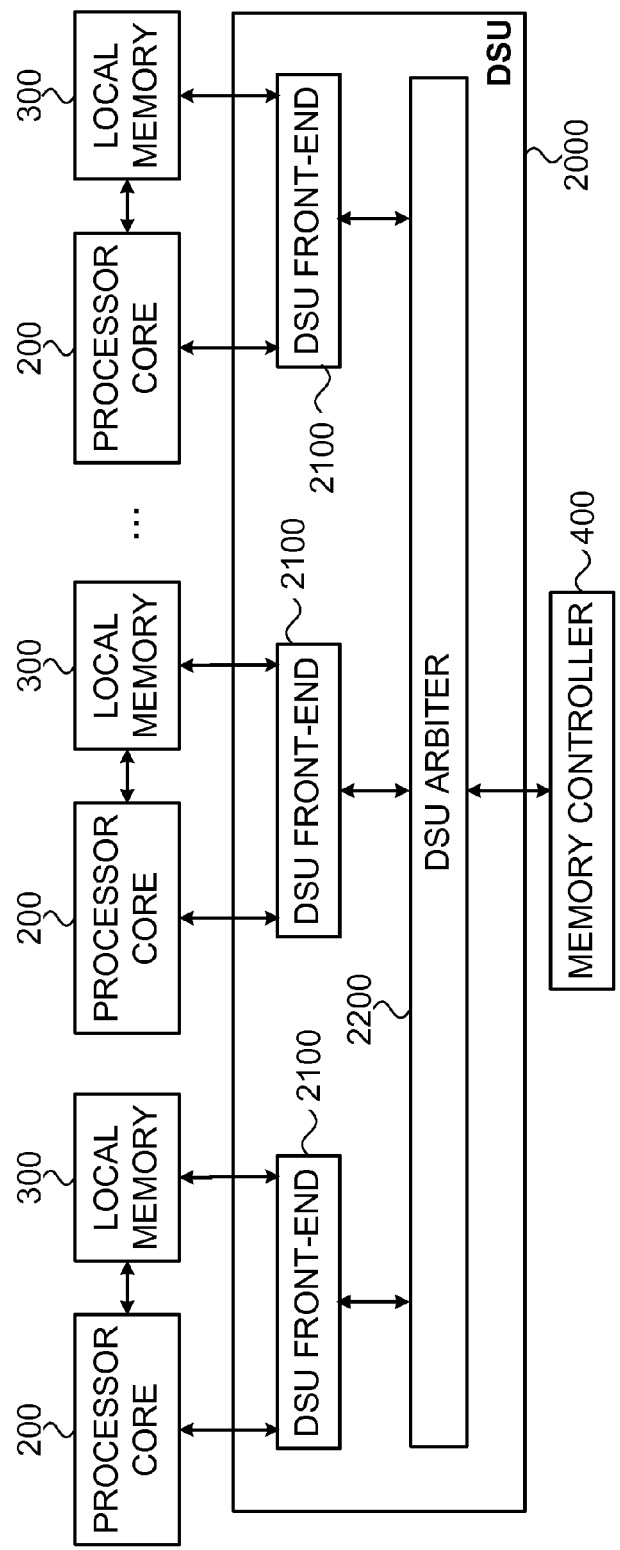
FIG. 2 is a block diagram that schematically illustrates a Data Streaming Unit (DSU), in accordance with an embodiment of the present invention.

FIG. 2 is a block diagram, which schematically illustrates a Data Streaming Unit (DSU) 2000, and the units to which it connects, including memory controller 400, processor cores 200 and local memories 300, in accordance with an embodiment of the present invention. DSU 2000 comprises a plurality of DSU Front End units 2100, each serving a respective processor core 200 and its associated local memory 300, and a single DSU Arbiter 2200, which arbitrates between memory access requests initiated by DSU front end units 2100.

The processor cores preprogram the DSU to move data from the memory to the local memories at initialization. DSU 2000 will then preload data from external memory 500 into local memories 300, reducing contention on read accesses to the external memory and, consequently, increasing the performance of multiprocessor system 10. Similarly, the processor cores preprogram the DSU to move data from the local memories to the external memory, so that contention on write accesses to the external memory will be reduced.

This configuration improves performance for several reasons. For example, traffic to and from external memory 500 can be optimized by a single controller (the DSU arbiter) that is aware of all traffic. Moreover, processor cores 200 are not stalled, since the data they require is fetched in advance, thereby lowering data access latency.

Every Read operation from an address in the external memory done by a processor core 200 is preceded by a corresponding Read operation from external memory 500 and a corresponding Write operation to local memory 300, both done by DSU front end unit 2100. Similarly, every Write operation done by the local processor to an address in the external memory is followed by a corresponding Read from local memory and a subsequent Write to the external memory, both done by the DSU.

In some embodiments, data transfer between processor cores 200 and external memory 500 is done by a plurality of circular buffers, located in the local memories, which will be described with respect to FIG. 3 below. Each processor core writes data into a respective circular buffer, and the DSU reads data from the circular buffers and writes it to the main memory. In embodiments where the main memory is external this will be done through external memory controller 400. For a Read operation, the DSU reads data from the main memory (through the external memory controller if the main memory is external), and writes it into the circular buffers; the processor cores read the fetched data from the circular buffers.

Figure 3:
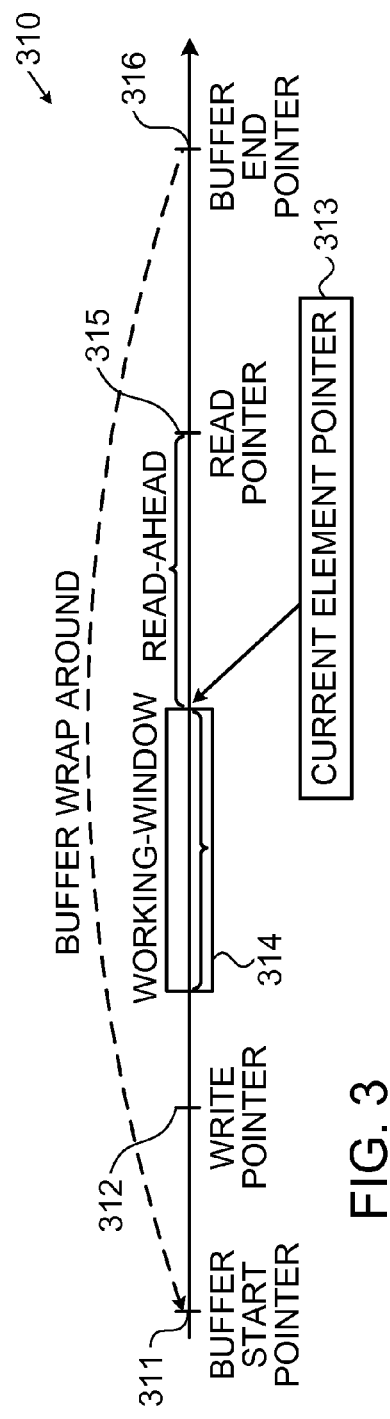
FIG. 3 is a graphical representation that schematically illustrates the structure of a circular buffer, in accordance with an embodiment of the present invention.

FIG. 3 schematically illustrates the structure of a Circular Buffer 310, in accordance with an embodiment of the present invention. I embodiments of the present invention, several circular buffers may be implemented in each local memory. A circular buffer located in a given local memory 300 is managed by the DSU front end unit 2100 and by the processor core 200 coupled to this local memory. The terms Read and Write, referred to in FIG. 3 and in the ensuing description, refer to Read and Write operations done by local processor 200.

The circular buffer has a Start Pointer 311, which points to a location in local memory 300 where the buffer starts, and an End Pointer 316 indicating the last location in local memory 300. The buffer is circular, and, for sequential accesses to the buffer, the location which follows end pointer 316 is start pointer 311.

The data element processed by local processor 200 is pointed at by Current Element Pointer 313, which is advanced by a special processor core instruction (to be described below). A working window 314 is defined, which contains valid data for the local processor. If the current element pointer reaches the value of the read pointer, the processor is stalled until new data arrives. In addition, if the value of read pointer 315 equals that of write pointer 312, further fetching of read data from the external memory will suspend until the write memory pointer will advance.

Figure 4:
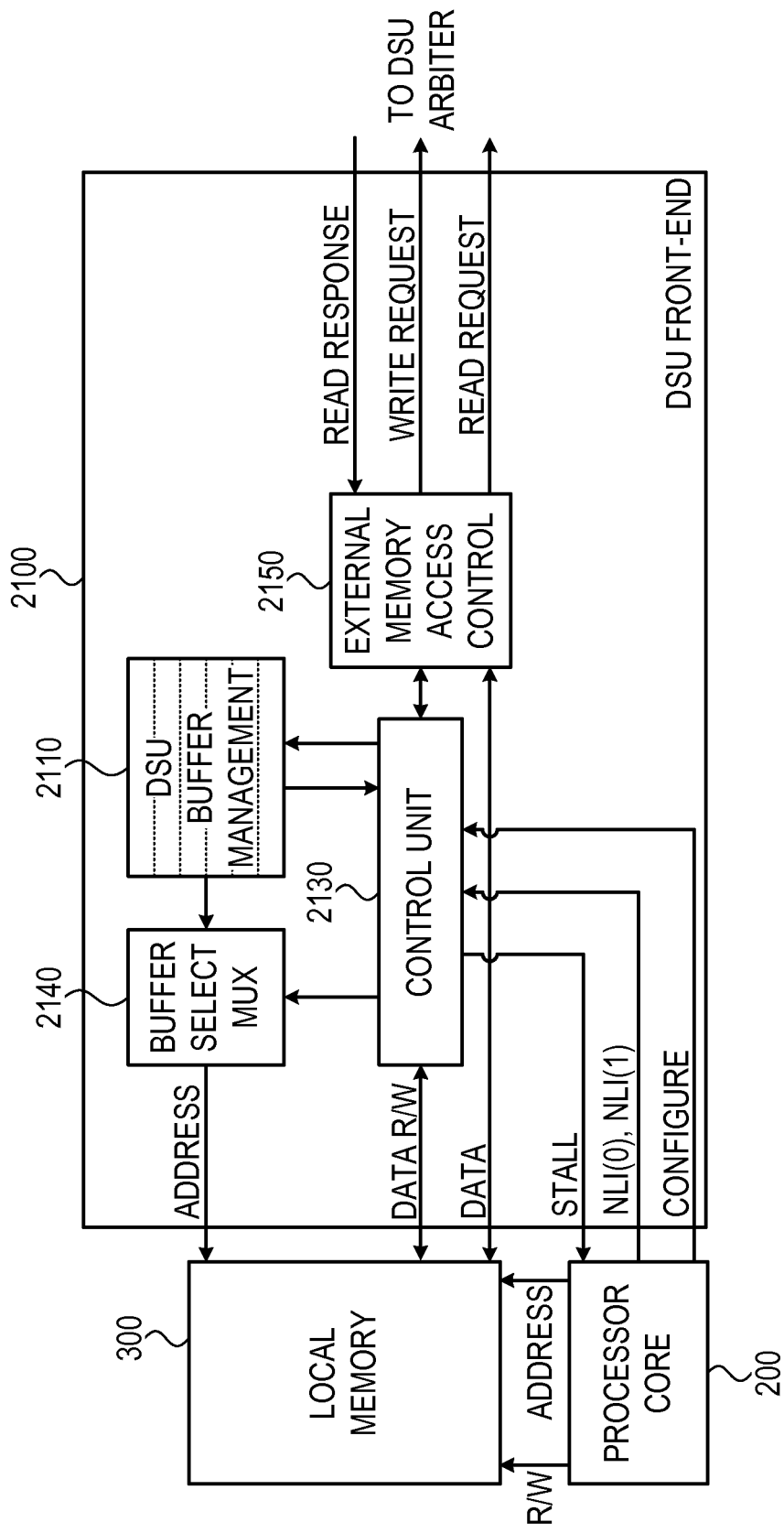
FIG. 4 is a block diagram that schematically illustrates the structure of a DSU front end, in accordance with an embodiment of the present invention.

FIG. 4 is a block diagram, which schematically illustrates DSU front end unit 2100, according to some embodiments of the present invention. The processor core 200 and the local memory 300 attached to the DSU front end unit are also depicted in the figure. Each DSU Front-End unit 2100 comprises a DSU Buffer Management unit 2110, a Control Unit 2130, a Buffer Select Multiplexor 2140 and an External Memory Access Control 2150. DSU front end unit 2110 is configured by processor core 200 to execute a list of tasks; such configuration may comprise programming a plurality of registers, located in Control Unit 2130, where each register may include bits to indicate Read, Write and data size, as well as the values of the buffer start and buffer end pointers for each circular buffer 310.

DSU Buffer Management unit 2110, which will be described in detail below, manages circular buffers 310. Unit 2110 increments the read and write pointers, wrapping around the buffer-end pointer to the buffer start pointer, and increments the current element pointer when an NLI(1) (to be described below) instruction is received from the processor core, again, wrapping around the buffer end pointer. In case an increment to the current element pointer causes its value to be equal to the value of the read pointer, buffer management unit 2110 signals processor core 200 to stall until new data is received.

Control unit 2130 arbitrates between accesses to circular buffers 310 which entail access to local memory 200. Such arbitration may be done, for example, by a rotating priority scheme. A Buffer Select Multiplexor 2140 gets from control unit 2130 a pointer to the selected buffer, and outputs the address generated by said buffer to local memory 300.

Control unit 2130 also controls an External Memory Access Control 2150, which generates read and write requests and gets read responses from DSU arbiter 2200. Data from external memory access unit 2150 may transfer directly to local memory 300; however, if the size of data read or written from or to the external memory is different from the size of the data port of the local memory, additional buffering/logic (not shown) may be used.

Figure 5:
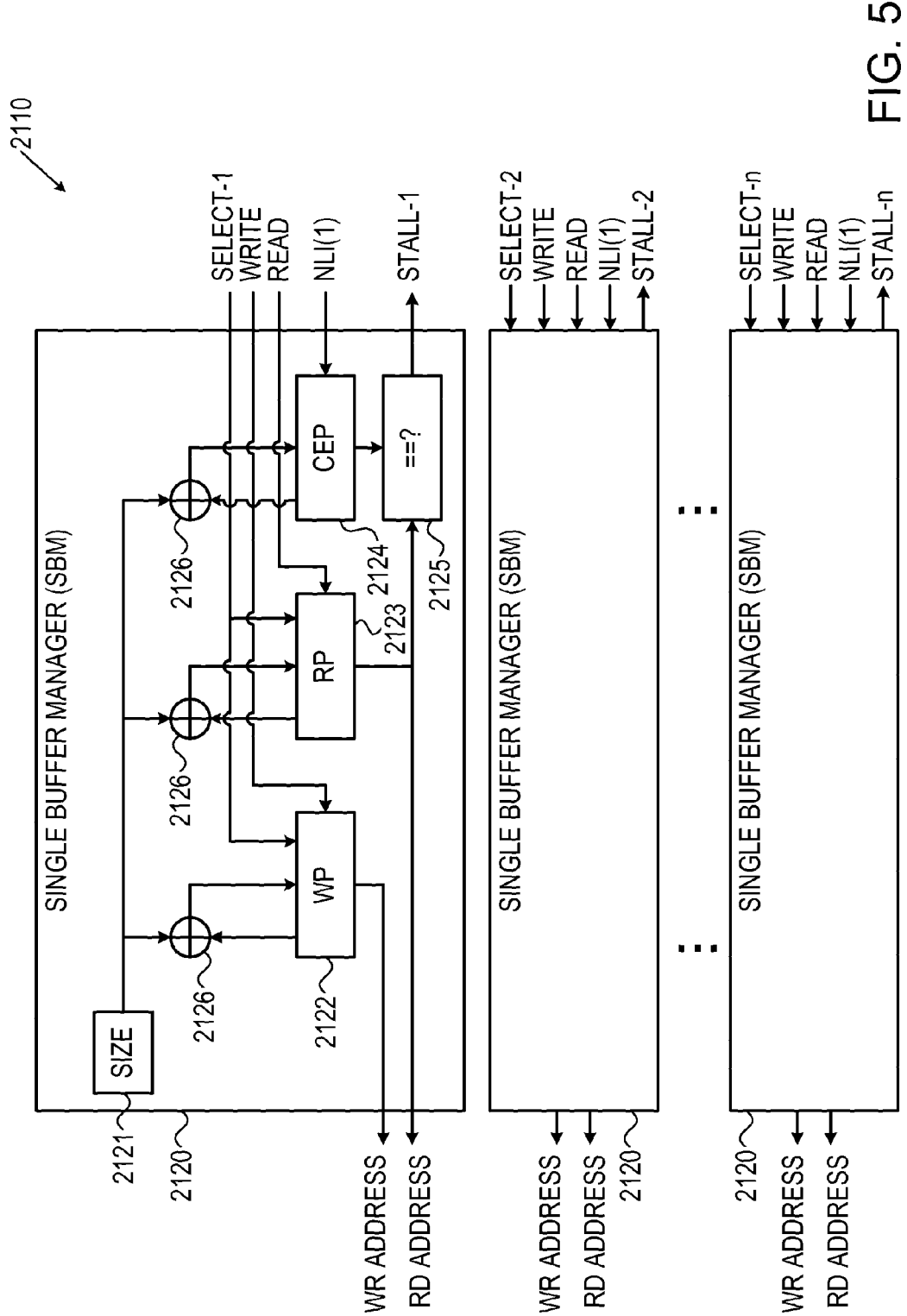
FIG. 5 is a block diagram that schematically illustrates the structure of a buffer management unit in the DSU front-end, in accordance with an embodiment of the present invention.

FIG. 5 is a block diagram, which schematically illustrates DSU buffer management unit 2110, according to some embodiments of the present invention. Buffer management unit 2110 is incorporated in the DSU front end unit 2100, and controls accesses to a plurality of circular buffers. In some embodiments, DSU buffer management unit 2110 comprises a plurality of identical single buffer manager units (SBM's)

2120, where each SBM controls a single respective circular buffer in local memory 300. SBM 2120 may comprise a Read Pointer (RP) Register 2123, which holds the value of read pointer 315, a Write Pointer (WP) Register 2122, which holds the value of write pointer 312, and a Current Element Pointer (CEP) Register 2124, which holds the value of CEP 313. The read pointer points to the next memory location into which the DSU front end writes data which it reads from the external memory, and the write pointer points to the next memory location from which the DSU front end reads data which it will then write into the external memory.

SBM 2120 further comprises a Size register 2121, which stores the size of the data units (for example—in bytes) which are transferred in the current data transaction; adders 2126, which add the values stored in size register 2121 to the value in pointer registers 2122, 2123, 2124, so as to update them after each transaction; and, lastly, comparator 2125, which compares the value of CEP register 2124 to the value of RP register 2123, and asserts a "stall" output when they equal, and processor core 200 should be stalled.

The update of the read and write pointer registers 2122, 2123 is qualified by a Select input, activated by control unit 2130 (see FIG. 4), where there is a separate select line for each SBM 2120; the select lines are designated Select-1, Select-2 and so on. In addition to the select line, control unit 2130 asserts common control lines to all SBM's: Write and Read, to update the write pointer register 2122 and read pointer register 2123, respectively, of the selected SBM 2120; and NLI(1), to update all CEP registers 2124 of all SBM's 2120 of the DSU front end units 2100.

Returning now to FIG. 4, Control Unit 2130 executes the tasks which were preprogrammed in the DSU front end. The control unit is pre-configured by the processor core 200 with a list of memory transfer tasks; it then selects pointers from buffer management 2110 according to a criterion which may be, for example, rotating priority. The control unit then controls the address input of buffer-select-mux 2140 to output the selected address to local memory 300, and sends an indication word, which may comprise the index of the buffer and a read/write bit, to external memory access control 2150. In addition, when any SBM 2120 sets its Stall output, the control unit will assert an aggregate Stall output to processor core 200, to halt its operation until stall is cleared.

In addition to DSU configuration, which is done at initialization, control unit 2130 is controlled by two special processor instructions: NLI(0) and NLI(1). NLI(1) is used to advance the current element pointers 313 in the circular buffers. It is set after each program loop iteration, when the processor needs a new set of parameters to calculate the next value or values.

The updated parameters comprise the current element pointers of all active SBMs. The update is typically performed in a single cycle for all SBMs together, and taking into account the cyclic buffer wrap location. The NLI instruction also verifies that the new location of the Current-Element Pointer (CEP) has already been filled with the required data fetched from the external memory. If not, the processor core is stalled until the read Pointer (RP) and Current-Element Pointer meet the requirement (i.e., until RP>CEP).

NLI(1) is directed by control unit 2130 to DSU buffer management 2110. NLI(0) is issued by processor core 200 when the program starts. The purpose of the NLI(0) instruction is to verify that the initial CEP is valid to process (i.e., that the required data has been read from the external memory and written to the local memory).

Read Pointer (RP) 315 and Write Pointer (WP) 312 will typically not advance from their initial position until NLI(0) is accepted. (RP is incremented since it needs to fetch data required to process the first element. WP is not incremented because the CEP is still pointing to the initial location, which is the same location that WP points to. Processed data is not available yet and therefore nothing is written to the external memory.)

External memory access control 2150 is activated by the control unit 2130 to initiate read and write requests to the DSU Arbiter 2200; it also gets read-responses from the DSU arbiter, and transfers the read data to the local memory.

Figure 6:
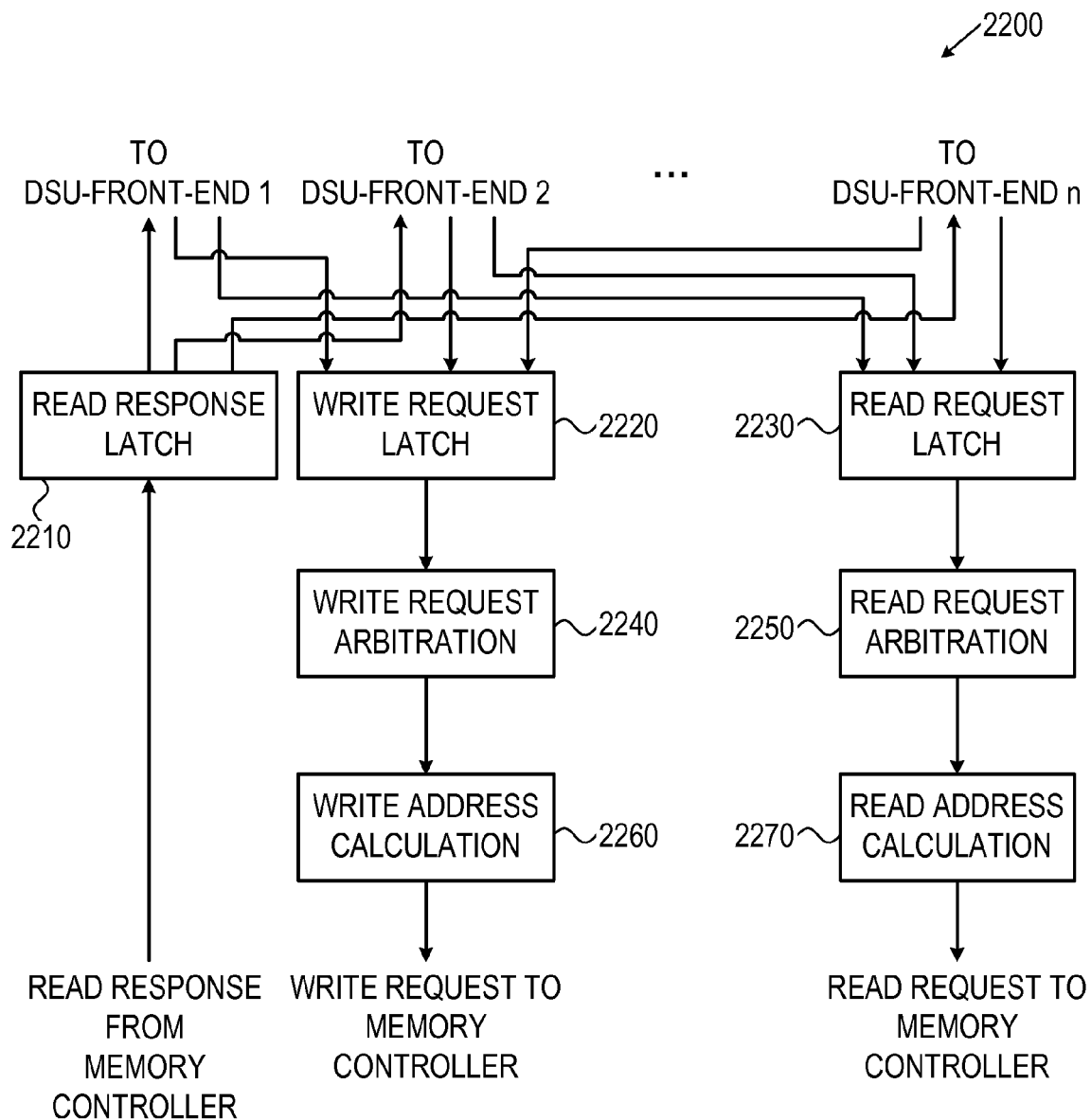
FIG. 6 is a block diagram that schematically illustrates the structure of a DSU arbiter, in accordance with an embodiment of the present invention.

FIG. 6 schematically illustrates the block diagram of a DSU Arbiter 2200, according to some embodiments of the present invention. DSU arbiter 2200 receives read and write requests from the plurality of DSU front-end-units 2100, arbitrates between the requests, calculates the corresponding addresses in the external memory and sends requests for external memory accesses to external memory controller 400. The DSU arbiter also routes responses to the read requests received from the memory controller back to the requesting DSU front-end units. In some embodiments of the present invention, write responses may not be needed, and any write request is assumed to be accepted. In other embodiments, not illustrated in FIG. 6, write responses are handled, and a unit similar to Read Response Latch 2210 (to be described below) is added to DSU arbiter 2200.

Read requests from the plurality of DSU front end units 2100 are latched in a Read Request Latch 2230. In embodiments of the present invention, read request latch 2230 includes, for each DSU front-end unit, an index indicating to which circular buffer the request corresponds, and a Pending bit, indicating that the request is valid and has not been handled yet. The requests from read request latch 2230 are input to a Read Request Arbitration unit 2250, which arbitrates between several concurrent read requests, using, for example, rotating priority scheme. Read request arbitration also clears the Pending bit of a selected request in read request latch 2230.

The selected read operation (one or more than one, as will be explained below) is output to a Read Address Calculation unit 2270, which keeps and updates pointers to the external memory (one pointer for every circular buffer in every local memory 300), and calculates the address in the external memory based on the pointer value and on parameters relating to the organization of the external memory; in some embodiments of the present invention the processed object is a video image, and such parameters may comprise image width, height and bytes per pixel. The output from Read Address Calculation is read requests to the external memory controller 400.

In some embodiments of the present invention, the bandwidth of accesses to the external memory is larger than the bandwidth in local memories 300; this may stem from a wider bus, a faster clock, or any combination thereof. In such embodiments it may be desirable to concurrently generate a plurality of memory accesses. Read Request Arbitration unit 2250 will, in those embodiments, select several read requests, and read address calculation unit 2270 will calculate addresses for several transactions at the same time.

The mechanism for write requests is similar to that described for Read, and comprises a Write Request Latch 2220 to latch write requests, a Write Request Arbitration unit 2240 to arbitrate between pending write requests, and a Write Address Calculation unit 2260, which calculates the addresses in the external memory. In some embodiments of the present invention, write request latch 2220, write request arbitration 2240 and write address calculation 2260 may be identical to read request latch 2230, read request arbitration 2250 and read address calculation 2270, respectively. In other embodiments the units are similar in nature, but because write are less frequent than reads, implementation of the write-related units may be optimized for lower area and performance.

Lastly, a Read Response Latch 2210 latches responses to the Read requests from memory controller 400, and outputs them to those DSU front end units 2100 which initiated the requests.

Scratch-Pad Unit

According to embodiments of the present invention, programs of multiprocessor system 10 that access shared memory resources are handled by Scratch Pad Unit 1000, which guarantees memory coherency and mitigates the delays associated with accessing of shared memory resources. The scratch pad unit is, in effect, a special purpose processor, with an instruction set that is optimized for efficient execution of shared memory tasks and for guaranteeing memory coherency.

Figure 7:
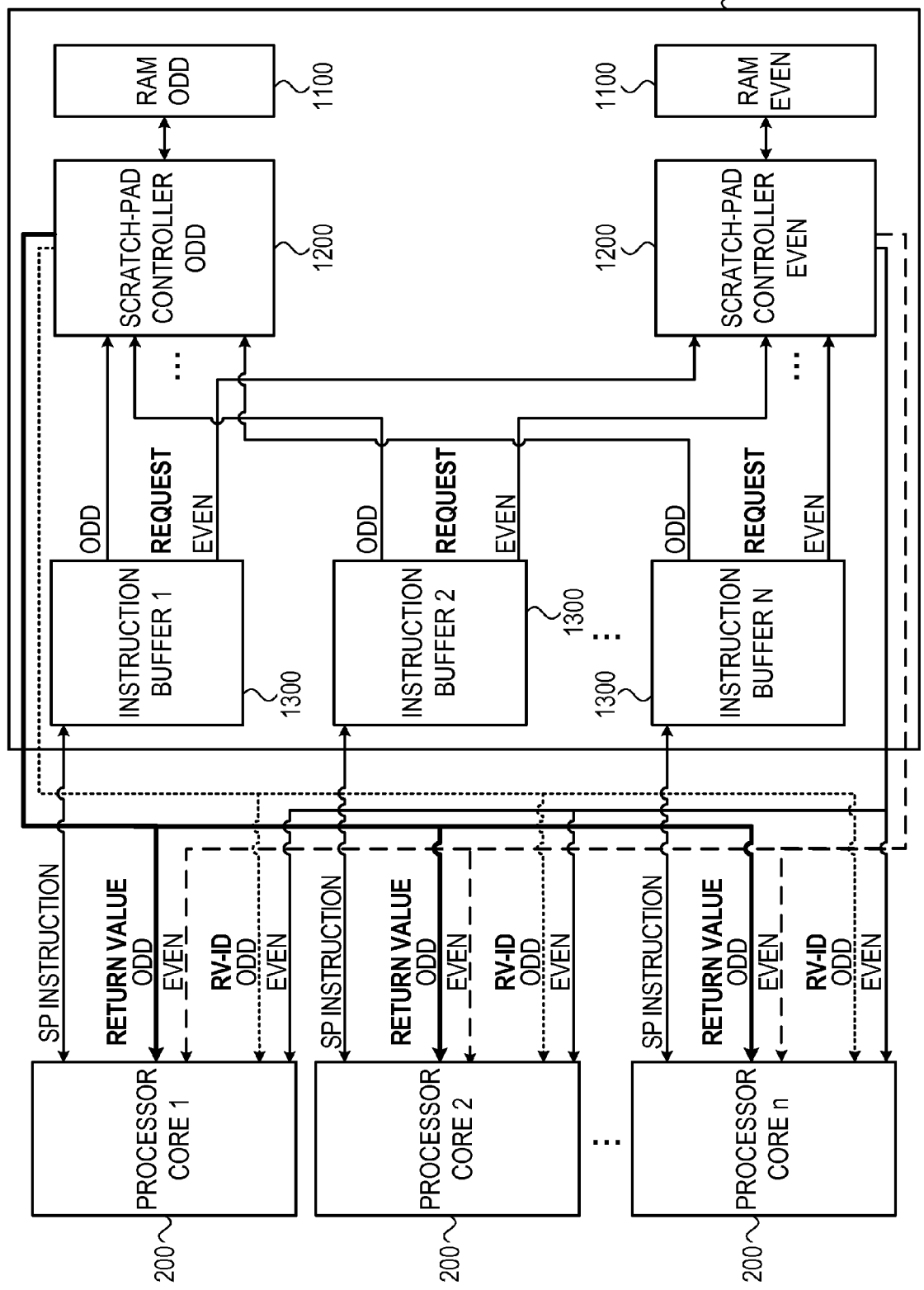
FIG. 7 is a block diagram that schematically illustrates the structure of a scratch-pad unit and system elements to which it connects, in accordance with an embodiment of the present invention.

FIG. 7 is a block diagram, which schematically illustrates a Scratch Pad unit 1000, and its interface to processor cores 200, in accordance with an embodiment of the present invention. A set of Scratch Pad Instructions (SP instructions, to be described below) is defined for processor cores 200. The SP instructions are sent by processor cores 200 to Instruction Buffers 1300, which then send them to Scratch-Pad Controllers 1200 for execution.

Processor cores 200 will refrain from sending new SP instructions to the instruction buffer to which they are coupled if the buffer has not yet forwarded the previous instruction to scratch-pad controller 1200, or if the previous instruction is one which expects a return value, and the return value has not yet been obtained. This mechanism may be implemented, for example, in hardware by stalling the appropriate processor cores.

Instruction buffers 1300 send the SP instructions to one of two scratch pad Controllers 1200, which arbitrate between plurality of instructions from the plurality of instruction buffers 1300, and select one of them for execution. According to some embodiments of the present invention the arbitration uses a rotating priority scheme.

Instructions which refer to even scratch-pad memory locations are output to the EVEN scratch pad controller 1200, whereas instructions which refer to odd locations are output to the ODD scratch pad controller. Therefore, the least significant bit of the address specified in the instruction is not forwarded to the scratch-pad controllers but, instead, used to select one of the two controllers.

Each scratch pad Controller 1200 is coupled to a RAM 1100, which is the scratch-pad memory or a part thereof. According to some embodiments of the present invention, the scratch pad memory is interleaved according to odd and even addresses; one RAM 1100 holds the even addresses (RAM EVEN in FIG. 7), while the other RAM 1100 (RAM ODD) holds the odd addresses. The scratch pad controller 1200 coupled to RAM EVEN is termed "Scratch Pad Controller EVEN", and scratch pad controller coupled to RAM ODD is termed "Scratch Pad Controller ODD". In other embodiments of the present invention, other types of interleaving may be used, for example, division to four groups according to the two least-significant address bits, or, for another example, division by hashing functions.

Some SP instructions may return value to the calling processor. Towards that end, each scratch pad controller 1200 outputs the return value to all processor cores 200. In addition, in order for each processor core to determine if the input data is the return value to the instruction that it had issued, each scratch pad controller 1200 asserts the ID code of the processor to which the returned data from the RAM is destined on an ID bus, which is output to all processor cores 200. After arbitration is granted, the latency in the scratchpad controller is fixed. Therefore, in an alternative embodiment, the instruction buffer may count the cycles and seize the data according to this count.

Table 1 is a list of nine SP instructions according to some embodiments of the present invention. Each SP instruction comprises an operation code, which distinguishes between the various SP instructions and may comprise 4-bits, an index, which is the address in the scratch pad memory, and may comprise, for example, 16-18 bits, and one or two operands.

TABLE 1

Scratch-Pad Instructions

| Instruction | Operands | Explanation |
|---|---|---|
| scp_add | [index], [OP1] | Scratchpad Add Instruction, implementing: SCP_MEM[index] = SCP_MEM[index] + OP1 |
| scp_max | [index], OP1] | Scratchpad Maximum Instruction, implementing: SCP_MEM[index] = MAX(SCP_MEM[index], OP1) |
| scp_min | [index], [OP1] | Scratchpad Minimum Instruction, implementing: SCP_MEM[index] = MIN(SCP_MEM[index], OP1) |
| scp_or | [index], [OP1] | Scratchpad Bitwise OR Instruction, implementing: SCP_MEM[index] = SCP_MEM[index] OR OP1 |
| scp_and | [index], [OP1] | Scratchpad Bitwise AND Instruction, implementing: SCP_MEM[index] = SCP_MEM[index] AND OP1 |
| scp_xor | [index], [OP1] | Scratchpad Bitwise XOR Instruction, implementing: SCP_MEM[index] = SCP_MEM[index] XOR OP1 |
| scp_cax | [index], [OP1], [OP2] | Scratchpad Compare-and-Exchange Instruction, implementing: if (SCP_MEM[index] == OP1) SCP_MEM[index] = OP2 RETURN_VALUE = ORIGINAL_SCP_MEM[index] |
| scp_ld | [index] | Scratchpad Load Instruction, implementing: RETURN_VALUE = SCP_MEM[index] |
| scp_st | [index], [OP1] | Scratchpad Store Instruction, implementing: SCP_MEM[index] = OP1 |

Figure 8:
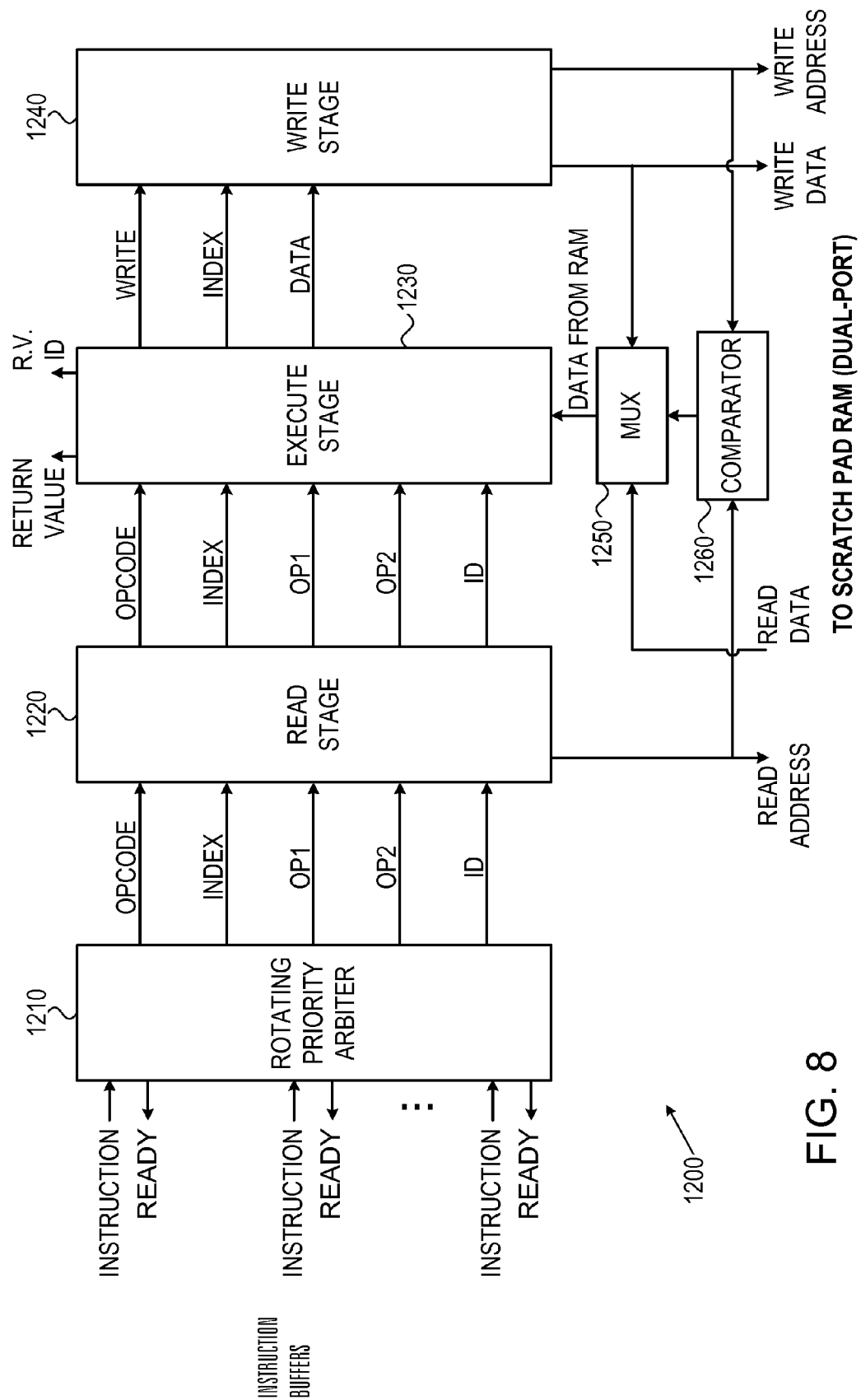
FIG. 8 is a block diagram that schematically illustrates a scratch-pad controller, in accordance with an embodiment of the present invention.

FIG. 8 is a block diagram that schematically illustrates the pipeline stages and the structure of a Scratch Pad Controller 1200, according to embodiments of the present invention. Scratch pad controller 1200 comprises a Rotating Priority Arbiter 1210 (Arbiter), a Read Stage unit 1220, an Execute Stage unit 1230, a Write Stage unit 1240, a Comparator 1260 and a Multiplexor 1250. Scratch-pad controller 1200 has a pipelined architecture, and the execution of an instruction is done in pipeline stages. When write stage 1240 writes the results of instruction n, execute stage 1230 performs the execute part of instruction n+1, read stage 1220 fetches the data from memory address specified in instruction n+2, and arbiter 1210 gets instruction n+3 from instruction buffer 1300.

Arbiter 1210 arbitrates between instructions input from the instruction buffers, and may employ, for example, a rotating priority scheme. When the arbiter selects an instruction source, it forwards the selected instruction to read stage 1220, and asserts a Ready output, which indicates to the instruction buffer that it can apply its next instruction (if available).

The instruction forwarded from arbiter 1210 to read stage 1220 may comprise five fields, wherein the first four fields are copied from the selected instruction, and comprise an Opcode field, an index field and one or two operands—OP1 and OP2; Table 1 above depicts the fields used by each instruction. The fifth field is an ID field, identifying the selected instruction buffer, and enabling routing of the return value to the processor core which originated the instruction.

Read stage 1220 outputs the fields of the instruction received from the arbiter after a delay of one clock cycle, to execute stage 1230. In addition, read stage 1220 asserts the address of the operand to be fetched from the scratch pad memory on a Read Address bus, which is coupled to the Read-Address port of RAM 1100. The address may be identical to the index field output from arbiter 1210. Data read from the RAM is routed, through multiplexor 1250 (to be explained below) to execute stage 1230; as the delay through RAM 1100 is one clock cycle, data from ram and the respective instruction will reach execute stage 1230 at the same clock cycles.

Execute unit 1230 executes the instruction, which may include performing the logic/arithmetic operations (if required), outputting the Return Value read from RAM 1100, and activating the Write stage 1240. The Return value is output to all processor cores 200, along with the ID of the processor which had initiated the instruction.

Write stage 1240 is activated only if the instruction has a Write part. It gets the index (address) of the memory location and the data to be written from the execute stage, along with a write activation signal. If a Write is required, execute stage 1230 asserts a write output, and sends the address (index) and the data, asserting the write address on the write address port, and the write data on the write data port of ram 1100.

Memory coherency mechanism is invoked if an instruction reads data from memory while new data is written into the same location by the previous instruction; due to the one clock cycle delay imposed by the pipeline, both accesses occur at the same clock cycle. Comparator 1260 compares the write address with the read address; if the two addresses are identical, multiplexor 1250 will route the written data directly to execute stage 1200, and the data read from ram 1100 will be ignored.

The configuration of system 10 and the configurations of the various system elements shown in FIGS. 1-8 are example configurations, which are shown purely for the sake of conceptual clarity. In alternative embodiments, any other suitable configurations can also be used. In some embodiments, the controllers and processors described herein, e.g., memory controller 400, processor cores 200 and scratch pad controllers 1200, may comprise general-purpose processors that are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Although the embodiments described herein mainly address SOC multiprocessor systems, the methods and systems described herein can also be used in other applications, such as in multiprocessor systems which are distributed in several integrated circuits, interconnected by buses or by networks or any combination thereof.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A multiprocessor system, comprising:
a main memory;
multiple processing cores, which are configured to execute software that uses data stored in the main memory;
a data streaming unit, which is connected between the processing cores and the main memory so as to serve the multiple processing cores and is configured to pre-fetch the data from the main memory for use by the multiple processing cores while arbitrating between simultaneous memory accesses that are performed on behalf of two or more of the processing cores; and
a respective local memory associated with each processing core and configured to maintain, in a circular buffer, a respective list of addresses in the main memory from which the data for the processing core is to be pre-fetched,
wherein the circular buffer comprises a read pointer indicating a first location in the local memory into which the data streaming unit is to write the data from the main memory, and a write pointer indicating a second location in the local memory from which the data streaming unit is to write the data to the main memory, and is configured so that when the read pointer reaches the write pointer, further fetching of the data is suspended until the write pointer has advanced.

2. The multiprocessor system according to claim 1, wherein the data streaming unit is configured to store the data in the main memory on behalf of the multiple processing cores.

3. The multiprocessor system according to claim 1, wherein the data streaming unit comprises, for each processing core, a respective front-end unit that is configured to receive from the processing core the respective list of addresses in the main memory, and to pre-fetch the data from the main memory in accordance with the list.

4. The multiprocessor system according to claim 3, wherein each processing core and the corresponding front-end unit are configured to exchange the data via the respective local memory.

5. The multiprocessor system according to claim 1, wherein at least the processing cores and the data streaming unit are comprised in a single integrated circuit.

6. The multiprocessor system according to claim 1, wherein the circular buffer comprises a current element pointer, which is advanced by the processing core to indicate a next location in the respective local memory from which the processing core is to read the data.

7. The multiprocessor system according to claim 6, wherein when the current element pointer reaches the read pointer, the processing core is stalled until new data arrives.

8. A multiprocessor system, comprising:
a main memory;
multiple processing cores, which are configured to execute software that uses data stored in the main memory; and a scratch-pad processing unit, which is connected to the processing cores and is configured to execute, on behalf of the multiple processing cores, a selected part of the software that causes two or more of the processing cores to access concurrently a given item of data, wherein the scratch-pad processing unit comprises:
a dedicated memory for storing the given item of data that is accessed by the two or more of the processing cores; and
a scratch-pad controller, which is configured to accept scratch-pad instructions from the multiple processing cores and to execute the accepted scratch-pad instructions in the dedicated memory without physically locking the dedicated memory, wherein the scratch-pad controller comprises:
an arbiter, which is configured to arbitrate the scratch-pad instructions accepted from the multiple processing cores in a rotating priority scheme;
read, execute and write stages arranged in order in a pipeline so as to execute the scratch-pad instructions provided by the arbiter according to the rotating priority scheme;
a comparator coupled to compare respective memory addresses of the scratch-pad instructions in the read and write stages; and
a multiplexer, which is configured to route data from the write stage back to the execute stage when the respective memory addresses are identical.

9. The multiprocessor system according to claim 8, wherein at least the processing cores and the scratch-pad processing unit are comprised in a single integrated circuit.

10. A method for data processing, comprising:
executing software, which uses data stored in a main memory, on multiple processing cores of a multiprocessor system;
pre-fetching the data from the main memory by a data streaming unit that is connected, so as to serve the multiple processing cores, between the processing cores and the main memory, for use by the multiple processing cores, while arbitrating between simultaneous memory accesses that are performed on behalf of two or more of the processing cores; and
maintaining, in a circular buffer in a respective local memory associated with each processing core, a respective list of addresses in the main memory from which the data for the processing core is to be pre-fetched,
wherein the circular buffer comprises a read pointer indicating a first location in the local memory into which the data streaming unit is to write the data from the main memory, and a write pointer indicating a second location in the local memory from which the data streaming unit is to write the data to the main memory, and is configured so that when the read pointer reaches the write pointer, further fetching of the data is suspended until the write pointer has advanced.

11. The method according to claim 10, and comprising storing the data in the main memory on behalf of the multiple processing cores by the data streaming unit.

12. The method according to claim 10, wherein pre-fetching the data comprises providing the respective list of addresses in the main memory from each processing core to a respective front-end unit, and pre-fetching the data from the main memory by the front-end unit in accordance with the list.

13. The method according to claim 12, wherein pre-fetching the data comprises exchanging the data between each processing core and the respective front-end unit via the respective local memory that is associated with the processing core.

14. The method according to claim 10, wherein at least the processing cores and the data streaming unit are comprised in a single integrated circuit.

15. A method for data processing, comprising:
executing software, which uses data stored in a main memory, on multiple processing cores of a multiprocessor system; and
using a scratch-pad processing unit that is connected to the multiple processing cores, executing on behalf of the processing cores a selected part of the software that causes two or more of the processing cores to access concurrently a given item of data, wherein the scratch-pad processing unit comprises:
a dedicated memory for storing the given item of data that is accessed by the two or more of the processing cores; and
a scratch-pad controller, which is configured to accept scratch-pad instructions from the multiple processing cores and to execute the accepted scratch-pad instructions in the dedicated memory without physically locking the dedicated memory, wherein the scratch-pad controller comprises:
an arbiter, which is configured to arbitrate the scratch-pad instructions accepted from the multiple processing cores in a rotating priority scheme;
read, execute and write stages arranged in order in a pipeline so as to execute the scratch-pad instructions provided by the arbiter according to the rotating priority scheme;
a comparator coupled to compare respective memory addresses of the scratch-pad instructions in the read and write stages; and
a multiplexer, which is configured to route data from the write stage back to the execute stage when the respective memory addresses are identical.

16. The method according to claim 15, wherein at least the processing cores and the scratch-pad processing unit are comprised in a single integrated circuit.

* * * * *